United States Patent

Kobayashi et al.

[11] Patent Number: 5,381,472
[45] Date of Patent: Jan. 10, 1995

[54] POWER SOURCE CONTROL APPARATUS FOR TELEPHONE SET

[75] Inventors: Kazuhide Kobayashi; Takehiko Ishii; Osamu Kai, all of Tokyo, Japan

[73] Assignee: Tamura Electric Works, Ltd., Tokyo, Japan

[21] Appl. No.: 743,150

[22] Filed: Aug. 9, 1991

[30] Foreign Application Priority Data

Aug. 10, 1990 [JP] Japan .................. 2-210432

[51] Int. Cl.6 ........................................... H04M 19/00
[52] U.S. Cl. ..................... 379/387; 379/413; 379/322
[58] Field of Search ................. 379/322, 387, 413

[56] References Cited

U.S. PATENT DOCUMENTS

| | | | |
|---|---|---|---|
| 3,800,095 | 3/1974 | Cowpland | 379/387 |
| 4,748,664 | 5/1988 | Blomely | 379/387 |
| 4,893,337 | 1/1990 | Blossfeldt | 379/387 |
| 4,916,735 | 4/1990 | Iida et al. | 379/413 |
| 4,961,220 | 10/1990 | Tentler et al. | 379/413 |
| 5,216,704 | 6/1993 | Williams et al. | 379/413 |

Primary Examiner—James L. Dwyer
Assistant Examiner—M. W. Shehata
Attorney, Agent, or Firm—Blakely, Sokoloff, Taylor & Zafman

[57] ABSTRACT

A power source control circuit for a telephone set, includes a power source switch, a detecting circuit, a power hold circuit, and a control circuit. The power source switch supplies an external power to the telephone set. The detecting circuit detects an off-hook operation of the telephone set or an incoming signal arriving at a line. The power hold circuit holds the power source switch in an ON state for a predetermined time period on the basis of an output from the detecting circuit. The control circuit is activated by supply of the external power and transmits an extension signal for extending the ON state of the power source switch within the predetermine time period.

9 Claims, 3 Drawing Sheets

POWER SOURCE CONTROL APPARATUS FOR TELEPHONE SET

BACKGROUND OF THE INVENTION

The present invention relates to a power source control apparatus for a telephone set, for supplying an external power to execute processing when the processing is necessary.

Conventionally, in order to prevent unnecessary power consumption, no power is supplied to a card type public telephone set in a normal state to set it in an inoperative state. At the same time an off-hook operation for making a call is executed or an incoming signal arrives from an office line, a power is supplied from an external power source such as a commercial power source provided independently of a local power source (internal power source) for based on a line current an operation during power failure to activate the telephone set. That is, when the external power is supplied, a control unit in the telephone set is activated to be in an operative state to execute initialization and determines whether the activation condition is an off-hook output or an incoming detection signal. The control unit performs originating call speech processing or incoming call speech processing in accordance with the determination result. When the speech processing is finished, the control unit stops supply of the external power and transits to a standby state.

In a conventional telephone set of this type, supply and holding of the external power are locally executed in accordance with an off-hook output or incoming signal detection independently of the control circuit. After the control circuit finishes speech processing, the holding state of the power supply is released by an output from the control circuit. Therefore, if the control unit does not perform the release operation because it runs away or for some other reasons, the holding state is not released to fail to stop the power supply. As a result, the power is semipermanently, unnecessarily consumed.

SUMMARY OF THE INVENTION

It is an object of the present invention to provide a power source control apparatus for a telephone set, which can prevent unnecessary power consumption.

It is another object of the present invention to provide a power source control apparatus for a telephone set, which does not perform final supply of a power while a control unit is inoperative.

It is still another object of the present invention to provide a power source control apparatus which automatically stops supply of a power when an abnormality such as run away occurs in a control unit in operation.

In order to achieve the above objects of the present invention, there is provided a power source control apparatus for a telephone set, comprising a power source switch for supplying an external power to the telephone set, a detecting circuit for detecting an off-hook operation of the telephone set or an incoming signal arriving at a line, a power hold circuit for holding the power source switch in an ON state for a predetermined time period on the basis of an output from the detecting circuit, and a control circuit, activated by supply of the external power, for transmitting an extension signal for extending the ON state of the power source switch within the predetermine time period.

DETAILED DESCRIPTION OF THE PREFERRED EMBODIMENTS

Figure 1:
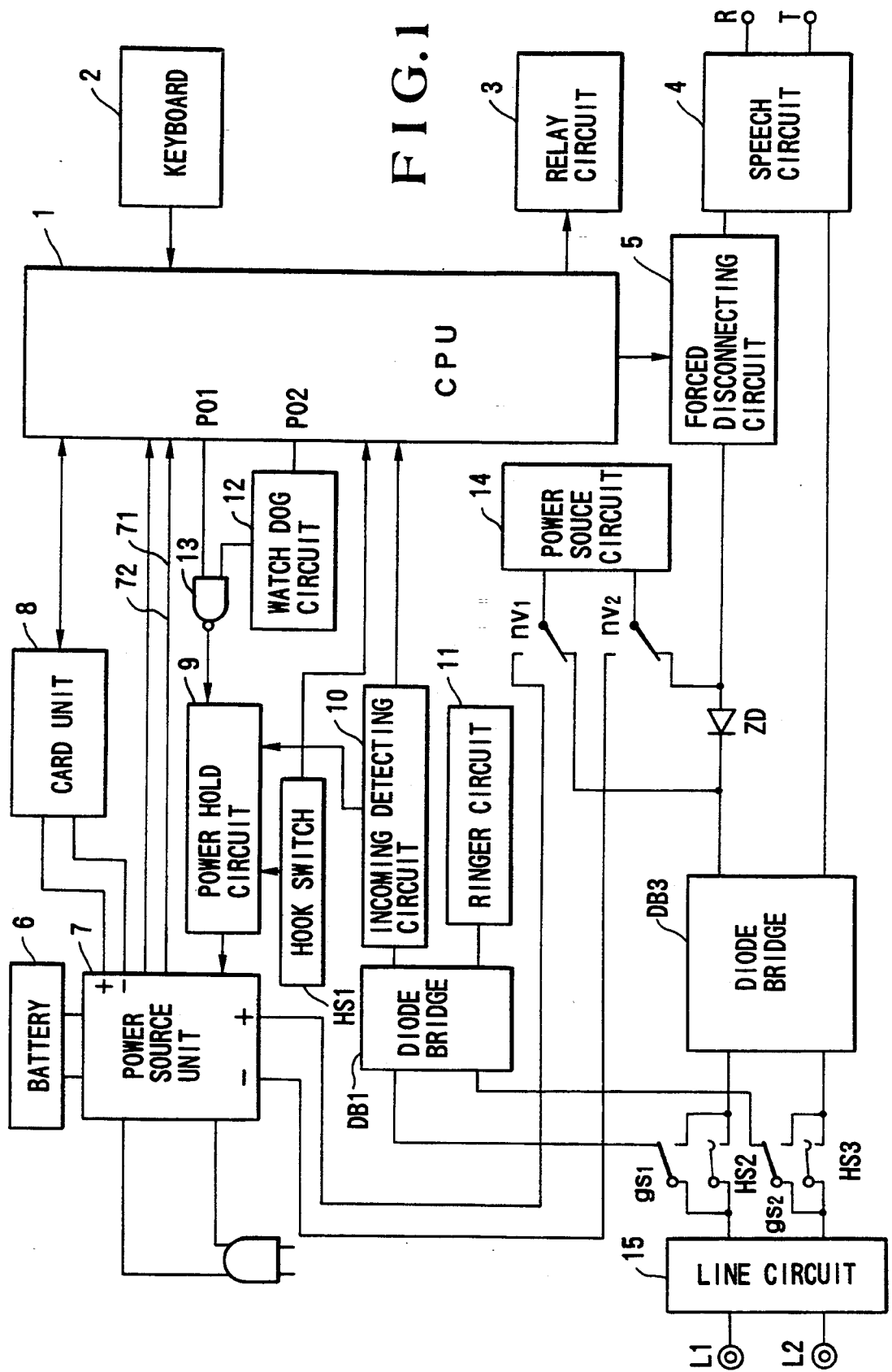
FIG. 1 is a block diagram showing an embodiment of a power source control apparatus for a telephone set according to the present invention.
Figure 3:
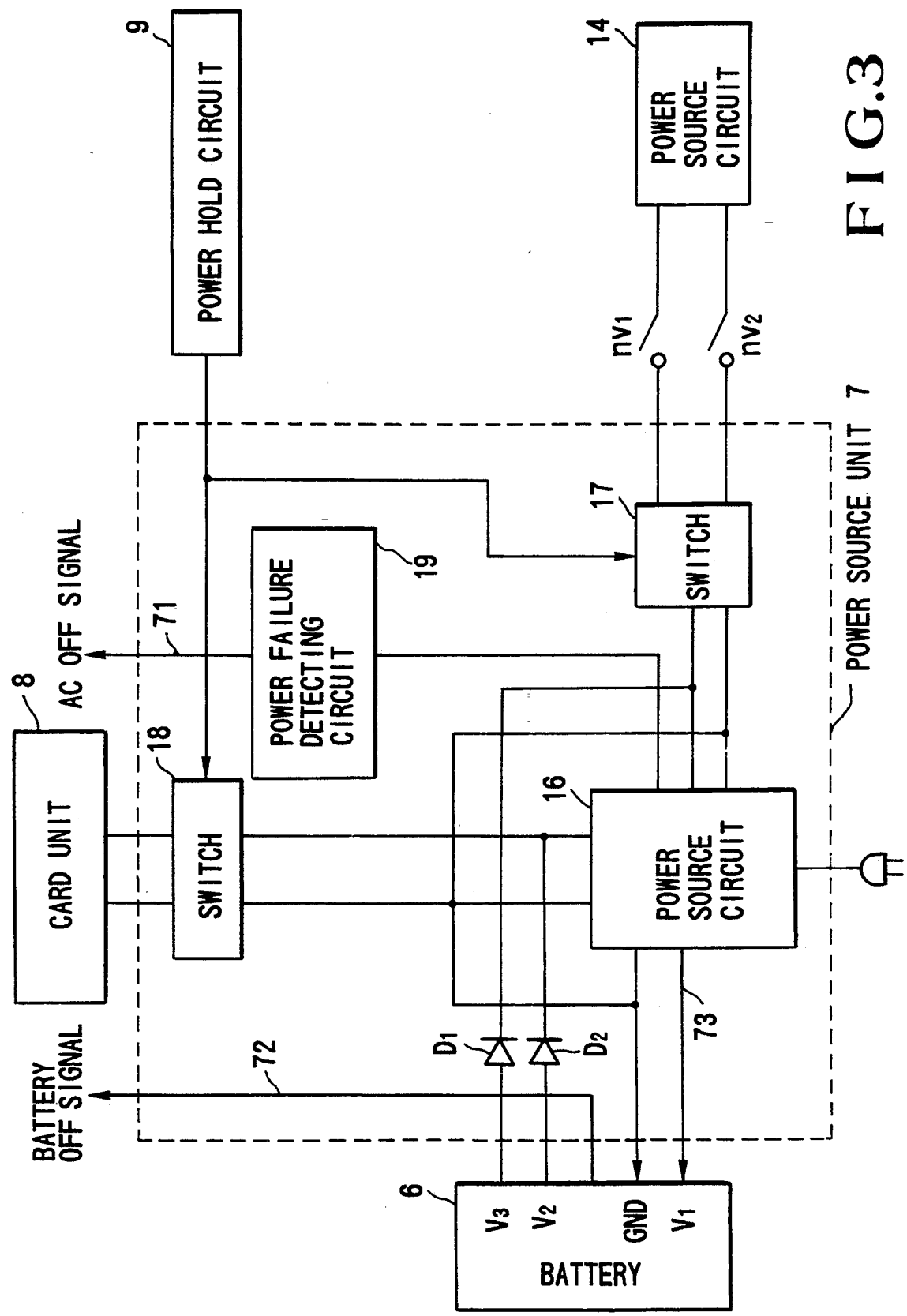
FIG. 3 is a block diagram showing a power source unit.

The present invention will be described below with reference to the accompanying drawings. FIG. 1 shows an arrangement of a power source control apparatus for a telephone set according to the present invention, and FIG. 3 shows an arrangement of a power source unit. Referring to FIG. 1, reference numeral 1 denotes a CPU for performing various processing controls of a card type public telephone set using a prepaid card or a credit card; 2, a keyboard such as dial keys connected to the CPU 1; 3, a relay circuit for receiving a power source voltage V2 and having a switching relay NV of a latching type and a speech control relay GS; 4, a speech circuit, connected to a transmitter T and a receiver R, for performing speech communicaton between lines L1 and L2; 5, a forced disconnecting circuit for opening the lines when the remaining amount of a prepaid card is used up during speech communication; 6, a battery to be switched to supply a power for a predetermined time period when a commercial power source fails; 7, a power source unit for supplying a DC power source voltage converted from a commercial AC power to a card unit and a power source circuit (both of which will be described later) and having a power failure monitor circuit for outputting an AC OFF signal 71 and a battery OFF (dissipation) signal 72 to the CPU 1 and a power source switch held in an ON state by an input hold signal; 8, a card unit for receiving a power from the power source unit 7 to perform card processing for a card; 9, a power hold circuit for outputting a power hold signal for setting the power source switch of the power source unit 7 in an ON state for a predetermined time period (temporary supply) or continuously (final supply); 10, an incoming detecting circuit for detecting an incoming signal from the lines L1 and L2; 11, a ringer circuit for generating a ringing tone in accordance with an incoming signal; 12, a watch dog circuit for monitoring a watch dog pulse from an output port PO2 to detect run away of the CPU 1; 13, a NAND gate for receiving an output from the watch dog circuit and an extension signal from an output port PO1 of the CPU 1 and supplying an output to the power hold circuit 9; and 14, a power source circuit, selectively connected to the power source unit 7 for supplying a power source voltage V3 and the two terminals of a Zener diode ZD served as a line current power generating means for supplying a local power thorough relay contacts nv1 and nv2, for supplying a power to the respective parts of the telephone set except for the card unit. When the commercial power source as an external power source or the battery 6 is in an ON state, i.e., in a power source effective state and the telephone set is in an operative state, the power source circuit 14 is switched to the power source unit 7 by the contacts nv1 and nv2 of the switching relay NV. In a power source reactive state and a telephone set inoperative state (off-hook state), the power source circuit 14 is connected to the Zener diode ZD, as shown in FIG. 1. Reference numeral 15 denotes a line circuit; DB1, a first diode bridge for applying a rectified incoming signal to the incoming detecting circuit 10 and the ringer circuit 11; DB2, a second diode bridge for maintaining the polarity of a speech loop constant; gs1 and gs2, contacts of a speech control relay GS for forming a speech loop upon making an originating call or reception of an incoming call; and HS1 to HS3, hook switches.

Referring to FIG. 3, reference numeral 16 denotes a power source circuit constituted by an AC/DC converter for converting a commercial AC power into a DC power; 17 and 18, power source switches held in an ON state by the hold signal from the power hold circuit 9; 19, a power failure detecting circuit, connected to the power source circuit 16, for detecting a power failure in the commercial power source and outputting an AC OFF signal 71 to the CPU 1; D1 and D2, diodes connected by a floating system to tile battery 6 to prevent reverse current supply to the battery 6; 72, a battery OFF signal output from the battery 6 when it goes down; and 73, a charge path from the power source circuit 16 to the battery 6.

Figure 2:
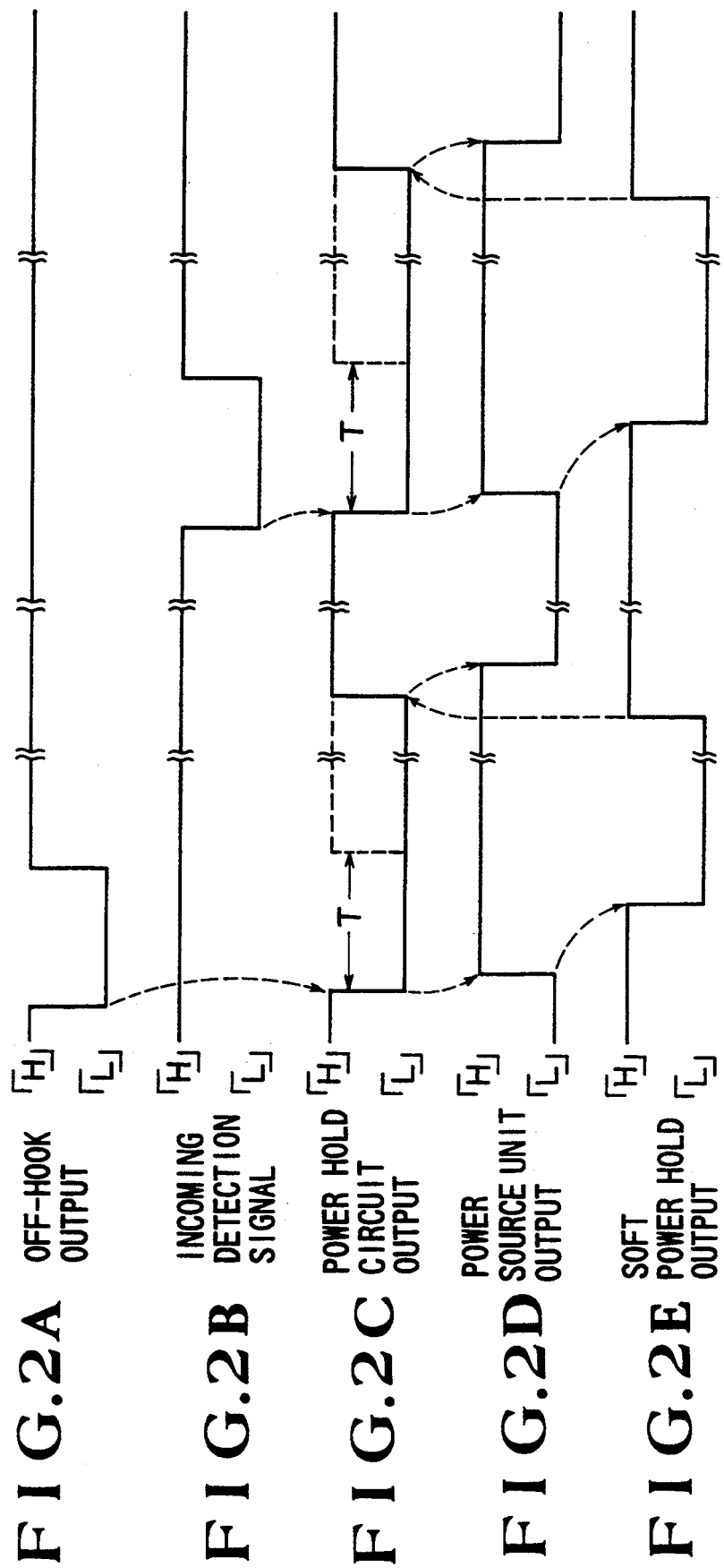
FIGS. 2A to 2E are timing charts for explaining operations of the respective parts of the circuit.

FIGS. 2A to 2E show operation timings of the respective parts of the power source control apparatus of this telephone set. FIG. 2A indicates an operation timing of tile hook switches HS1 to HS3; FIG. 2B, a timing of the incoming detection signal from the incoming detecting circuit 10; FIG. 2C, a timing of the output from tile power hold circuit 9; FIG. 2D, an operation timing of the power source unit 7; and FIG. 2E, an operation timing of a soft power holding means to be described later.

An operation performed in a power source effective state will be described below with reference to the timing charts shown in FIGS. 2A to 2E. As described above, the telephone set is activated by the power source unit 7 under the two conditions, i.e., when calling is performed by an off-hook operation or an incoming signal arrives. When calling is performed by an off-hook operation, an off-hook output as shown in FIG. 2A is supplied to the power hold circuit 9 by the hook switch HS1. When an incoming signal arrives, the arrival of the incoming signal from the lines L1 and L2 is detected by the incoming detecting circuit 10, and an incoming detection signal as shown in FIG. 2B is supplied to the power hold circuit 9 similarly to the off-hook output.

Each of the off-hook output and the incoming detection signal supplied to the power hold circuit 9 is a pulse signal of "L" having a predetermined duration. Upon receiving these signals, the power hold circuit 9 outputs the power hold signal to the power source unit 7 to set the power source switches 17 and 18 in an ON state for a predetermined time period T for which the pulse signal of "L" is input. Although the predetermined time period T of the power hold signal is defined by the input pulse signal width of "L", a timer which operates in accordance with an input signal may be incorporated so that the predetermined time period is defined by an output from the timer 9a. When the power source switch 17 is turned on and the power source voltage rises to a predetermined level or more, the switching relay NV of the relay circuit 3 operates to set a holding state, thereby connecting the power source circuit 14 to the power source unit 7 via the power source switch 17. Therefore, the power source circuit 16 of the power source unit 7 starts power supply to the power source circuit 14 as shown in FIG. 2D and similarly supplies the power source voltage to the card unit 8 via the power source switch 18. As a result, the power source circuit 14 starts supply of the power source voltage to the respective telephone set parts except for the card unit 8, and the CPU 1 is activated to start its operation. The CPU 1 which started its operation starts execution of programs to perform control by software (soft power holding means) such that an extension signal of level "L" is output to the power hold circuit 9 via the NAND gate 13 before the predetermined time period T is finished as shown in FIG. 2E, thereby extending the power supply time from the power source unit 7.

More specifically, since the extension signal is supplied, the power hold circuit 9 continuously supplies the signal for holding the power source ON state to the power source unit 7 even when the off-hook output by the hook switch HS1 or the incoming detection signal from the incoming detecting circuit 10 is no longer supplied and the predetermined time period T is finished, thereby enabling successive power supply from the power source unit 7.

Meanwhile, the CPU 1 drives the speech control relay GS to close the speech loop almost simultaneously with the above operation, thereby continuously executing the processing corresponding to the state of the telephone set. When speech end processing evoked by an on-hook operation or the like is finished and no further processing is necessary, the CPU 1 switches the extension signal of Level "L" output to the power hold circuit 9 to a signal of level "H" to instruct switching of the power source switches 17 and 18 of the power source unit 7 to an OFF state. When the power source switches 17 and 18 of the power source unit 7 are turned off by the output from the power hold circuit 9 to stop power supply to the CPU 1, the CPU 1 is set in an inoperative state. As a result, the telephone set is set in a standby statue for waiting for an off-hook output or arrival of an incoming signal. At this time, the switching relay NV and the speech control relay GS are almost simultaneously restored by the CPU 1, the contacts nv1 and nv2 are switched to the Zener diode ZD, and the speech loop is opened by the contacts gs1 and gs2.

Although the CPU 1 outputs the extension signal to the power hold circuit 9, the extension signal may be output as a power hold signal directly to the power source unit 7 to continue the ON state of the switches 17 and 18.

As described above, in response to an off-hook operation or arrival of an incoming signal, the power hold circuit 9 initially controls the power source unit 7 for only a predetermined time period to supply a power to the telephone set. Therefore, even if the telephone set supplied with the power goes down for some reasons, power supply to the telephone set can be stopped in a predetermined time period since the CPU 1 does not generate an extension signal. Therefore, no power is unnecessarily consumed.

After the CPU 1 transmits a signal indicating power supply extension to the power hold circuit 9 when a predetermined time period has elapsed from activation of the CPU 1, the CPU 1 may malfunction by run away or the like to fail to transmit a power supply stop signal. This inconvenience is avoided as follows. Normally, a logical AND signal of the power supply extension signal output from the output port PO1 of the CPU 1 and an output signal from the watch dog circuit 12 for detecting run away of the CPU 1 is output to the power hold circuit 9 to extend the power supply time of the power source unit 7 with respect to the telephone set. While the CPU 1 supplied with the power normally executes processing, it supplies the extension signal of level "H" from the output port PO1 to one input terminal of the NAND gate 13, and periodically outputs watch dog pulses from the output port PO2 to the watch dog circuit 12. At this time, an output from the watch dog circuit 12 is kept at level "H", and this "H"—level signal is supplied to the other input terminal of the NAND gate 13. As a result, an output from the NAND gate 13 goes to level "L". Therefore, while the CPU 1 normally operates, the power source unit 7 keeps the ON state of the switches 17 and 18 by the power hold signal from the power hold circuit 9, and the power source continues power supply to the telephone set.

However, when the CPU 1 runs away and no longer supplies a periodic signal to the watch dog circuit 12, the watch dog circuit 12 supplies a run away detection signal of level "L". Therefore, the NAND gate 13 supplies a signal of level "H" to the power hold circuit 9 regardless of whether the extension signal from the output port PO1 is present. As a result, the power hold circuit 9 stops transmission of the hold signal to the power source unit 7, and the power source unit 7 stops power supply to the telephone set.

When the commercial power source and the battery 6 are set in a power source reactive state during operation of the telephone set, the CPU 1 detects the AC OFF signal 71 and the battery OFF signal 72 from the power source unit 7 to restore the switching relay NV, thereby switching the power supply for the telephone set to the power source based on a line current to transit to a speech state not using the card unit 8.

If the power source reactive state is set when the telephone set is activated, the power hold circuit 9 is rendered inoperative and the switching relay NV does not operate. Therefore, the telephone set is supplied with power from the line current by the power source circuit 14 to allow making of a free call or reception of an incoming call.

As has been described above, the power source control apparatus for a telephone set according to the present invention does not transit to final supply when the control unit is not activated by temporary supply of an external power for a predetermined time period, and automatically stops supply of the external power when the control unit ruins away after the final supply is started. Therefore, unnecessary power consumption can be prevented.

What is claimed is:

1. A power source control apparatus for a telephone set, comprising:
    a telephone set that performs speech processing in accordance with an off-hook operation thereof and finishes the speech processing in accordance with an on-hook operation thereof;
    a first power source means for supplying power to said telephone set;
    a power source switching means for selecting ON and OFF states to switch on and off operations of said first power source means;
    a detecting means or detecting at least one of an off-hook operation of said telephone set for an outgoing call and an incoming call signal arriving at a line;
    a power hold means for holding said power source switching means in the ON state for a predetermined time period on the basis of an output from said detecting means, said predetermined time period being set to be time enough for starting operations of said telephone set; and
    a control means activated by power from said first power source means, for outputting an extension signal to said power hold means so that said power hold means continuously holds said power source means in the ON state and stopping output of said extension signal at the end of the speech processing of the telephone set in order to switch said power source switching means to the OFF state.

2. An apparatus according to claim 1, further comprising a run away detecting means for detecting run away of said control means and discontinuing the output of the extension signal from said control means.

3. An apparatus according to claim 2, further comprising a gate means for receiving said extension signal from said control means and outputting the extension signal to said power hold means, wherein said gate means closes a gate in accordance with the run away detecting output from said run away detecting means to stop the output of the extension signal.

4. An apparatus according to claim 1, wherein said power hold means outputs a power hold signal having a width of the predetermined time period to said first power source means in synchronism with a detection signal from said detecting means.

5. An apparatus according to claim 1, wherein said power hold means comprises a timer for outputting a power hold signal for holding in the ON state said power source switching means for the predetermined time period in accordance with input of a detection signal from said detecting means.

6. An apparatus according to claim 1, wherein said control means performs control processes on the basis of stored programs and has soft power holding means for starting a holding operation thereof upon supply of the power from said first power source means and performing the output of the extension signal by execution of one of said stored programs.

7. An apparatus according to claim 1, further comprising a line current power generating means for generating a line current and a second power source means, selectively supplied with power from said first power source means and the line current power from said second power source means, for applying a local power to a portion of said telephone set.

8. An apparatus according to claim 7, further comprising switching means for switching said power supply to said second power source means from said line current power generating means to the power of said first power source means when said telephone set is activated while the power from said first power source means is supplied.

9. A power source control apparatus for a telephone set performing speech processing in accordance with an off-hook operation thereof and finishing the speech processing in accordance with an on-hook operation thereof, comprising:
    a telephone set;
    a power source means for supplying power to components of said telephone set;
    a power source switch means for selecting ON and OFF states to switch on and off operations of said power source means;

a detecting means for detecting at least one of an off-hook operation of said telephone set for outgoing call and incoming call signals arriving at a line;

a power hold means for holding said power source switching means in the ON state for a predetermined time period on the basis of an output from said detecting means, the predetermined time period being set to be time enough for starting operations of the components of said telephone set; and a control means, activated by the power from said power source means, for outputting a power hold signal to said power source switching means by the starting operation thereof within the predetermined time period to continuously hold said power source switching means in the ON state and stopping output of the power hold signal at the end of the speech processing of said telephone set in order to switch said power source switching means to the OFF state.

* * * * *